United States Patent [19]

Nishikawa

[11] Patent Number: 4,732,186

[45] Date of Patent: Mar. 22, 1988

[54] UNIT-TYPE AUTOMOBILE SERVICING APPARATUS

[76] Inventor: Koichi Nishikawa, 58, Komatsu-cho, Toyohashi-shi, Aichi-ken, Japan

[21] Appl. No.: 734,283

[22] Filed: May 15, 1985

[30] Foreign Application Priority Data

May 24, 1984 [JP] Japan .................................. 59-103754

[51] Int. Cl.⁴ ............................................... B08B 3/02
[52] U.S. Cl. ...................... 134/123; 134/172; 187/8.54
[58] Field of Search .................... 134/45, 123, 172; 15/DIG. 2; 254/89 H, 421; 248/349; 187/8.54, 8.61, 8.64

[56] References Cited

U.S. PATENT DOCUMENTS

| | | | |
|---|---|---|---|
| 1,613,213 | 1/1927 | Wilde et al. | 134/123 X |
| 1,930,959 | 10/1933 | Potvin et al. | 254/421 |
| 1,934,494 | 11/1933 | Gillespie | 134/123 X |
| 2,156,582 | 5/1939 | Carlini | 254/421 |
| 2,337,670 | 12/1943 | Tourneau | 248/349 X |
| 2,593,635 | 4/1952 | Walker | 254/89 H |
| 2,732,846 | 1/1956 | Berezny | 15/DIG. 2 X |
| 3,011,501 | 12/1961 | Beranek | 134/123 X |
| 3,451,085 | 6/1969 | Hay | 15/DIG. 2 |
| 3,510,898 | 5/1970 | Tatara et al. | 15/DIG. 2 X |
| 3,797,059 | 3/1974 | Smith | 15/DIG. 2 X |
| 3,881,426 | 5/1975 | Long | 254/421 |
| 4,239,551 | 12/1980 | Smith | 15/DIG. 2 X |

FOREIGN PATENT DOCUMENTS

| | | | |
|---|---|---|---|
| 831956 | 1/1952 | Fed. Rep. of Germany | 134/123 |
| 62088 | 10/1951 | France | 134/123 |
| 357104 | 11/1972 | U.S.S.R. | 134/123 |
| 485788 | 1/1976 | U.S.S.R. | 134/123 |
| 1041350 | 9/1983 | U.S.S.R. | 15/DIG. 2 |
| 1050934 | 10/1983 | U.S.S.R. | 15/DIG. 2 |

*Primary Examiner*—Harvey C. Hornsby
*Assistant Examiner*—Frankie L. Stinson
*Attorney, Agent, or Firm*—Helfgott & Karas

[57] ABSTRACT

An automobile servicing apparatus according to the present invention is basically defined as a unit module and it includes a turntable having a diameter suitable for placing thereon an automobile to be serviced and provided with a lift mechanism for lifting the automobile above the turntable. A washing unit for washing the bottom of automobile is also provided and it is normally located outside of the turntable. When the turntable is set in orientation such that the guide groove provided in the turntable becomes aligned with the guide groove provided outside of the turntable, the washing unit may be moved along the aligned guide grooves in a reciprocating manner. Also provided is a main motor for driving to rotate the turntable.

14 Claims, 21 Drawing Figures

UNIT-TYPE AUTOMOBILE SERVICING APPARATUS

BACKGROUND OF THE INVENTION

1. Field of the Invention

This invention generally relates to an apparatus for servicing an automobile, and, in particular, to a unit-type automobile servicing apparatus using a turntable for locating thereon an automobile to be serviced.

2. Description of the Prior Art

Automobiles include parts which are worn by use, and, mainly because of this, they need to be serviced from time to time. Such an automobile servicing operation is carried out at various service stations, large-scale or small-scale. In large-scale service stations, various automobile servicing operations may be carried out effectively on the basis of division of labor; on the other hand, in small-scale stations, e.g., the so-called one-man-one-bay system, one person is required to carry out various kinds of operations, and, thus, the efficiency of operation tends to be lower. In addition, since the versatility in model increases year by year, the small-scale operation for servicing various models of cars is becoming even more difficult to carry out effectively.

SUMMARY OF THE INVENTION

It is therefore a primary object of the present invention to obviate the disadvantages of the prior art as described above and to provide an improved automobile servicing apparatus which can service various models of automobiles efficiently.

Another object of the present invention is to provide a unit-type automobile servicing apparatus which is suitable for use in a small-scale automobile service station.

A further object of the present invention is to provide an automobile servicing apparatus which allows various models of automobiles to be serviced by a minimum number of servicing personnel.

A still further object of the present invention is to provide an automobile servicing apparatus which is compact in size and thus requires only a limited space for installation.

A still further object of the present invention is to provide an automobile servicing apparatus whose size can be easily determined according to the intended capacity or volume of automobiles to be processed.

Other objects, advantages and novel features of the present invention will become apparent from the following detailed description of the invention when considered in conjunction with the accompanying drawings.

DESCRIPTION OF THE PREFERRED EMBODIMENTS

Figure 1:
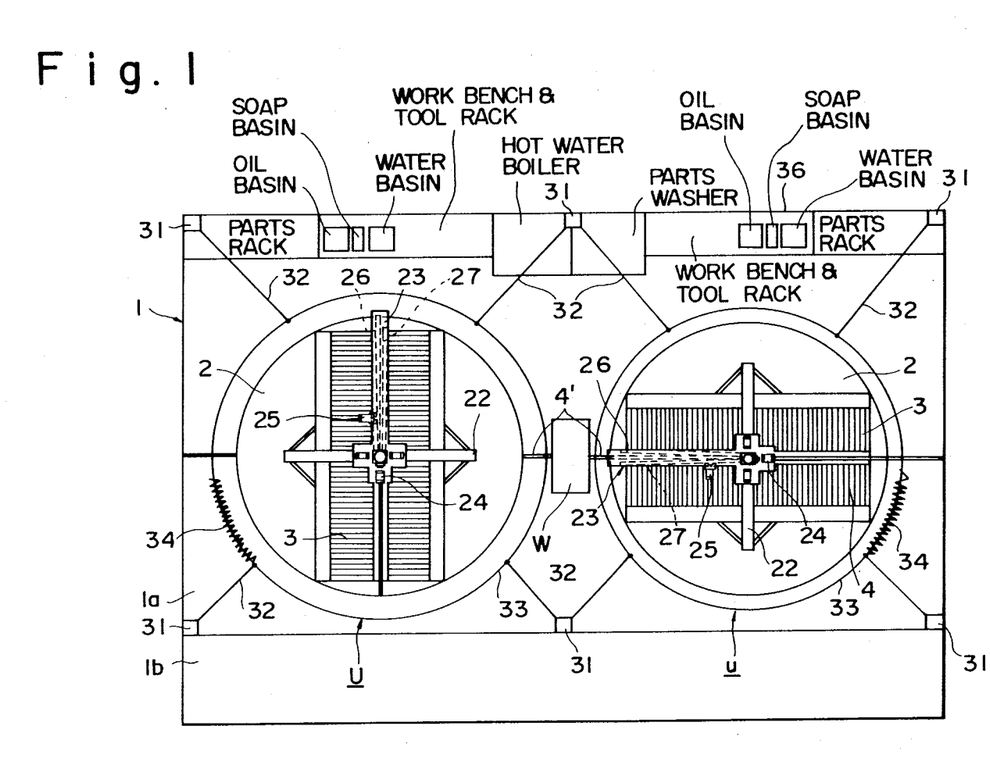
FIG. 1 is a schematic, plan view showing an automobile servicing apparatus constructed in accordance with one embodiment of the present invention.
Figure 2:
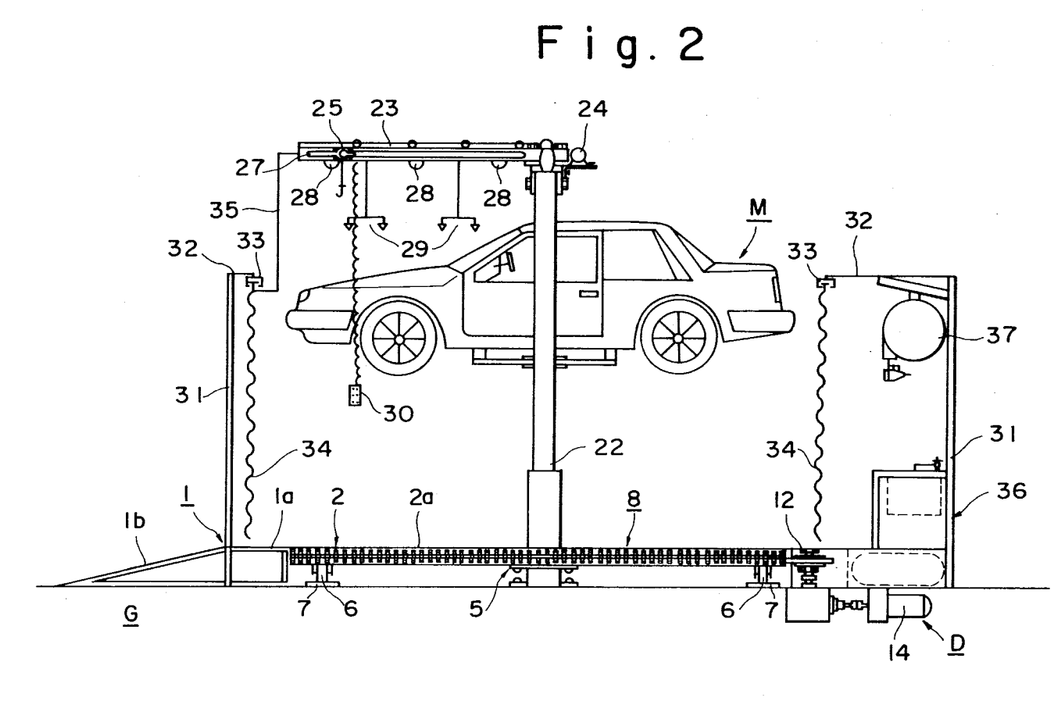
FIG. 2 is a schematic, side elevational view showing the apparatus of FIG. 1.
Figure 3:
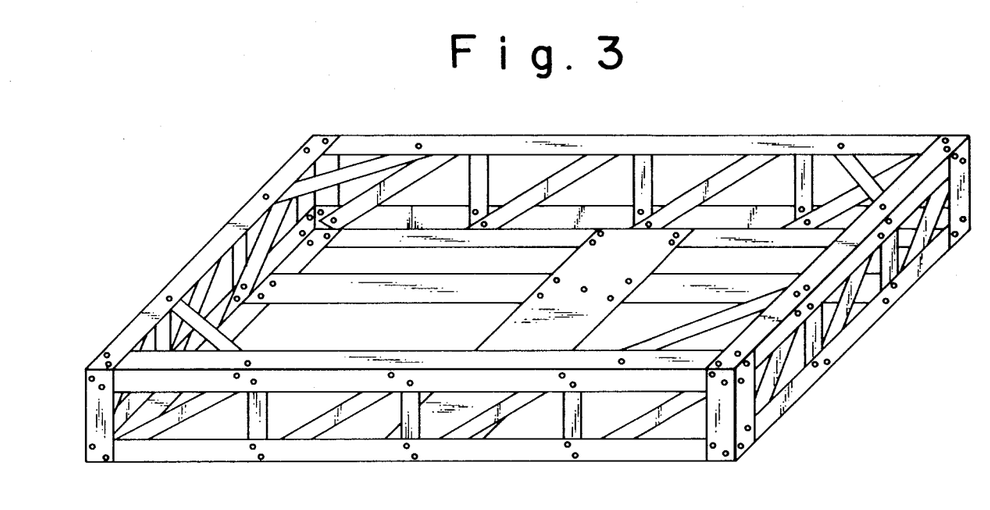
FIG. 3 is a perspective view showing the frame structure of a base forming part of the apparatus of FIG. 1.

Referring now to FIGS. 1 and 2, there is shown a unit type automobile servicing apparatus constructed in accordance with one embodiment of the present invention. The present embodiment is basically a place-on type, and, thus, the apparatus may be manufactured somewhere else, e.g., in a manufacturing plant, and it may be shipped to an automobile service station for installation. When the present apparatus is to be installed, it requires only a minimum amount of ground work. Basically, the present apparatus may be simply placed on the ground or floor for installation. In the illustrated embodiment, a pair of automobile servicing unit structures U embodying the present invention is provided and a self-driving type washer W for washing the bottom of automobile is also provided for common use. The automobile servicing apparatus illustrated in FIGS. 1 and 2 includes a base 1 including a framework comprised of angle plates as shown in FIG. 3.

The automobile servicing unit structure U includes a turntable 2 for placing thereon an automobile to be serviced. Typically, the turntable 2 has a diameter of approximately 4.5 meters, which is the size appropriate for locating an automobile to be serviced on the turntable 2. The turntable 2 is provided with a rectangular grating 3 for draining water. The grating 3 includes a plurality of ribs arranged spaced apart from each other at an interval such that small parts, such as bolts and nuts, do not pass through when dropped. Provided as recessed and extending along the longitudinal center line of the grating 3 is a guide groove 4 which guides the movement of the washer W when the turntable 2 is set in position for washing the bottom of automobile.

As shown in FIG. 2, when the present automobile servicing unit structure U is placed on a ground site G for installation, the turntable 2 is disposed such that its top surface 2a is flush with the top surface of a main body 1a of the base 1. In the illustrated embodiment, a slope member 1b is located adjacent to one side of the base main body 1a so that an automobile M may be easily driven into position on the turntable 2 for servicing or driven out of the unit structure U after servicing.

Figure 4:
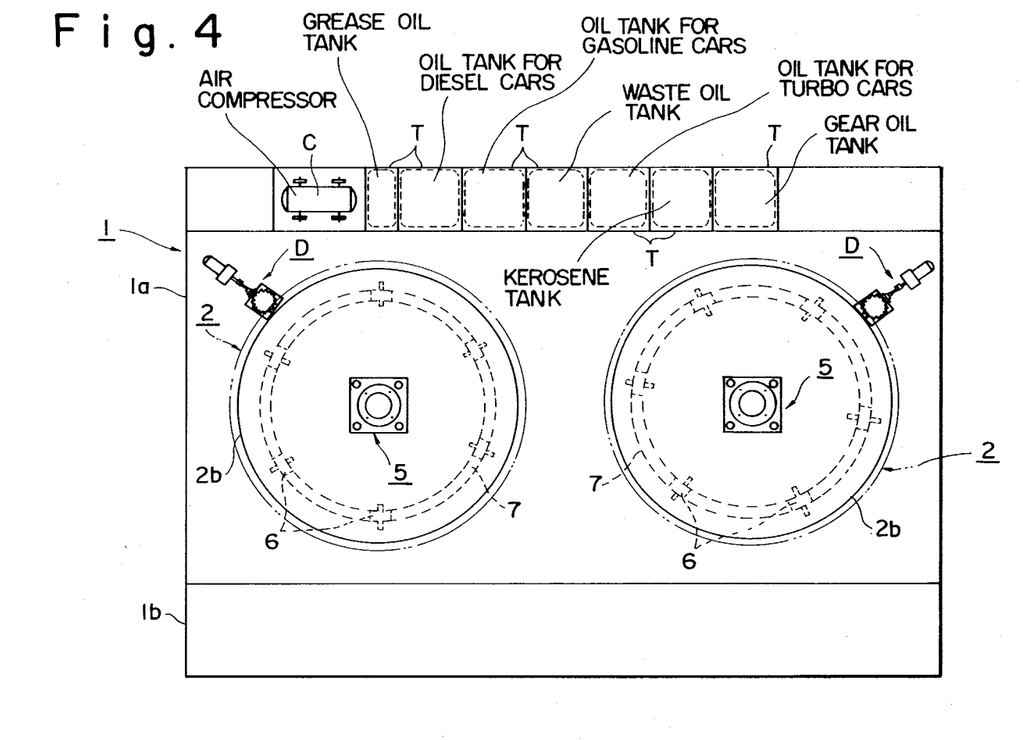
FIG. 4 is a schematic, plan view showing the structure of lower section of the apparatus of FIG. 1.
Figure 5:
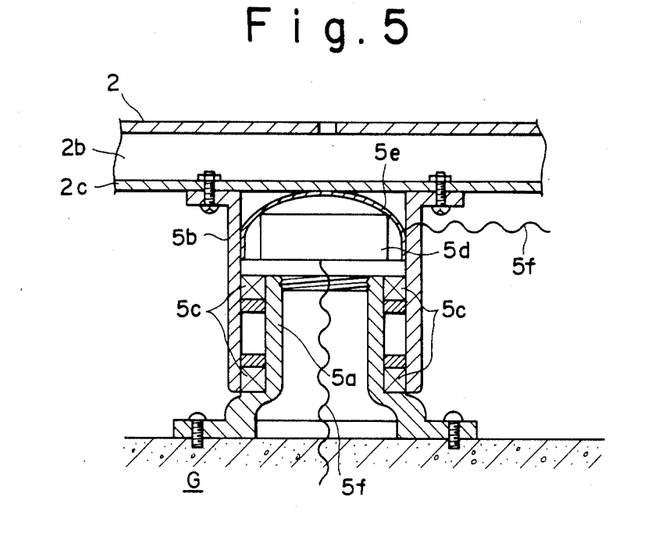
FIGS. 5, 6a, 6b and 7 are schematic illustrations showing various examples of a structure for supporting a turntable 2 forming part of the apparatus of FIG. 1.

Referring now to FIG. 4, there is shown the structure of that section of the present apparatus of FIG. 1 which is below the turntable 2. As shown, the turntable 2 has its bottom surface fixedly attached to a cylindrical member or drum 2b which is slightly smaller in diameter than the turntable 2. A reinforcing member 2c, e.g., comprised of angle plates, is also provided to give a predetermined structure strength to the turntable assembly. In the illustrated embodiment, the turntable 2 is rotatably supported by a supporting mechanism 5 which is similar in structure to the hub section of an automobile wheel axle, as shown in FIG. 5. In the structure shown in FIG. 5, an inner supporting cylinder 5a is provided with its bottom end fixedly attached to the site G, e.g., concrete floor. An outer supporting cylinder 5b is fitted onto the inner supporting cylinder 5a with a pair of upper and lower thrust bearings 5c, 5c sandwiched therebetween so that the outer supporting cylinder 5b is rotatable around the fixed inner supporting cylinder 5a. The outer supporting cylinder 5b has its top end fixedly attached to the reinforcing member 2c, and, thus, the turntable 2 can freely rotate around the longitudindal center line of the fixed inner supporting cylinder 5a.

A slip coupling 5d is provided in the space above the inner supporting cylinder 5a, and it allows to provide electric power to various components mounted on the truntable 2 through a line 5f having its one end connected to an electric power source, such as a commercial power line. The slip coupling 5d allows to keep electrical contact between the components on the turntable 2 and the power source even if the turntable 2 rotates. A cap 5e is disposed above the slip coupling 5d so as to prevent water, oil or the like from falling onto the slip coupling 5d. As shown in FIG. 4, a plurality of casters 6 are provided at the bottom of turntable 2 as spaced apart from each other at an equal interval in the circumferential direction. A circular track rail 7 is laid on the site G and the casters 6 roll along the rail 7 when the turntable 2 is driven to rotate. In the illustrated embodiment, there are provided six such casters 6 which, together with the supporting mechanism 5, supports the weight of turntable 2 and the automobile M placed thereon.

Figure 6A:
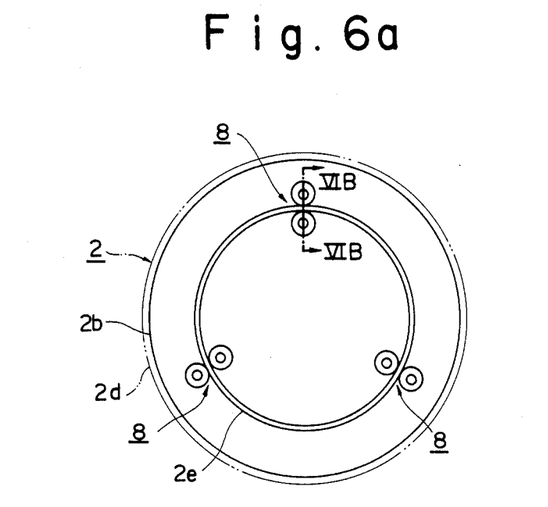
Figure 6B:
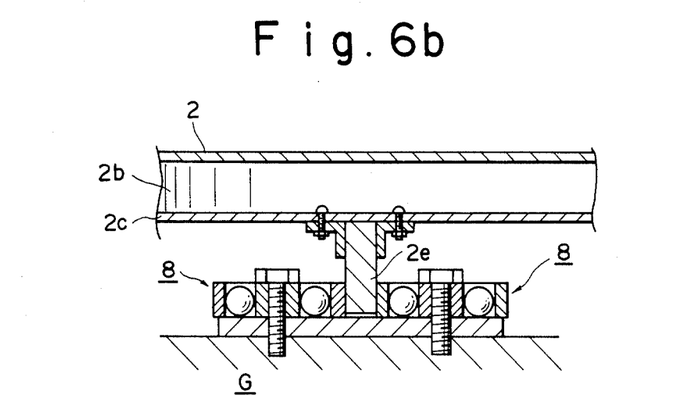
Figure 7:
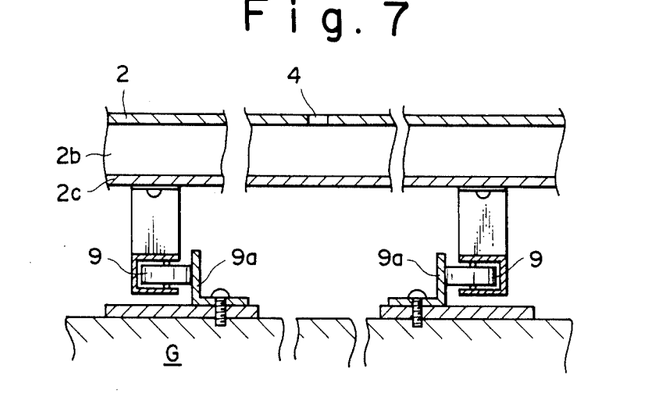

FIGS. 6a and 6b show an alternative structure for rotatably supporting the turntable 2, in which use is made of ball bearings 8. In this case, a circular guide rail 2e is fixedly attached to the reinforcing member 2c of the turntable assembly and a plurality of pairs, or three pairs in the illustrated embodiment, of ball bearings 8 are disposed along and one on each side of the moving path of the guide rail 2e as fixedly attached to the site G. As best shown in FIG. 6b, the paired ball bearings 8, 8 support the guide rail 2e from both sides in rolling contact therewith thereby determining the moving circular path of the guide rail 2e and thus the rotating center of turntable 2. As a further modification, the ball bearings 8 may be fixedly attached to the turntable assembly with the circular guide rail 2e fixedly attached to the site G. FIG. 7 shows a further alternative structure for rotatably supporting the turntable 2. In this case, a plurality of casters 9 are rotatably mounted at the bottom surface of the turntable assembly as spaced apart from each other in the circumferential direction. The casters 9 are held to be rotatable around the vertical rotating axis by means of brackets. And a circular guide rail 9a having an upstanding guide surface is fixedly mounted on the site G such that the casters 9 roll along the guide rail 9a. In this manner, the rotating axis of turntable 2 is defined.

Figure 8A:
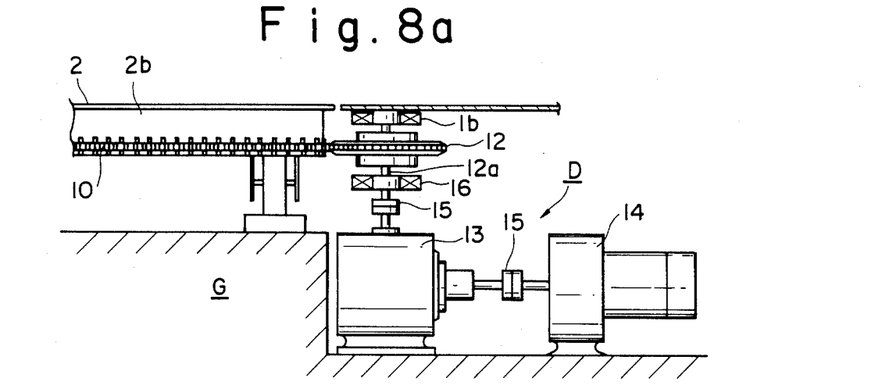
FIGS. 8a–8c are schematic illustrations showing a mechanism for driving to rotate the turntable 2 in the apparatus of FIG. 1.
Figure 8B:
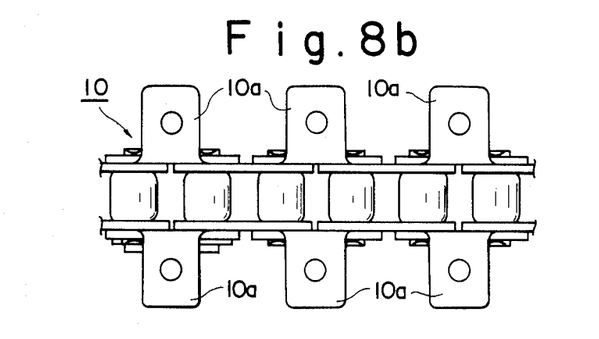
Figure 8C:
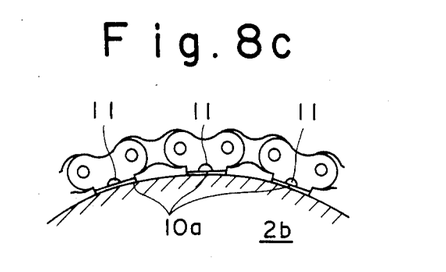

Referring now to FIG. 8a, there is shown the driving mechanism for driving to rotate the turntable 2 in the apparatus of FIG. 1. As shown in FIG. 8a, a continuous chain 10 is fixedly attached to the outer peripheral surface of the drum 2b. The chain 10 is provided with fixing lugs 10a on both sides and these lugs 10a are preferably fixedly attached to the outer peripheral surface of the drum 2b, for example, by means of anchoring bolts 11. A driving device D for driving to rotate the turntable 2 through engagement with the chain 10 is disposed adjacent to the periphery of turntable 2. The driving device D includes a sprocket wheel 12 which engages with the chain 10, a speed-variable gear box 13 and a gear motor 14 provided with a brake mechanism and capable of gradually increasing and decreasing speed. Also provided are coupling flanges 15 for coupling two rotating shafts. With such a driving structure, use may be made of a small-capacity motor in the order of $\frac{1}{2}$ HP and 0.4 kW as the motor 14 for properly and smoothly rotating the turntable 2 with the automobile M placed thereon. It is important that no sudden increase or decrease in speed be present in the rotation of turntable 2 from the viewpoint of securing safety for the servicing operation on the turntable 2. Also provided is a pair of pillow blocks 16, 16 for rotatably supporting a rotating shaft 12a of the sprocket wheel 12.

Figure 9A:
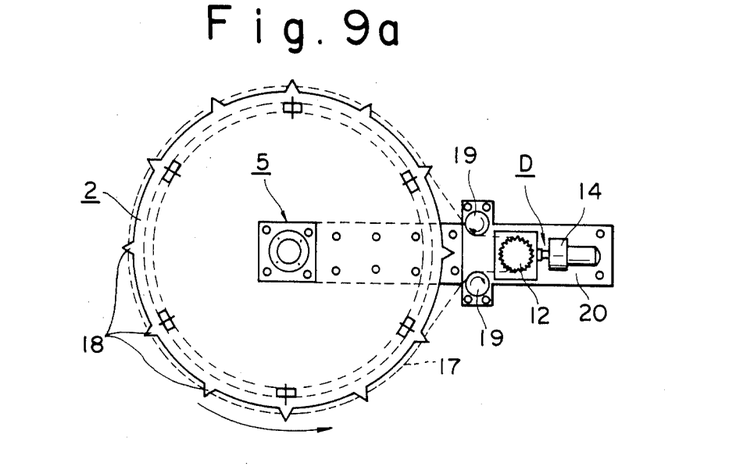
FIGS. 9a and 9b are schematic illustrations showing alternative mechanisms for driving to rotate the turntable 2.

FIG. 9a shows an alternative structure for the driving mechanism D for driving to rotate the turntable 2. In this case, a plurality of isolated gear teeth 18, typically 12 to 16 in number, are fixedly provided at the outer peripheral surface of turntable 2 as spaced apart from each other in the circumferential direction and projecting radially outwardly. On the other hand, the driving mechanism D disposed adjacent to the periphery of turntable 2 includes the sprocket wheel 12, the motor 14 operatively connected to the sprocket wheel 12, and a pair of guide rollers 19 and 19. Then, an endless moving chain 17, which is indicated by the dotted line, extends around the outer peripheral surface of turntable 2 in engagement with the isolated gear teeth 18 and also around the sprocket wheel 12 in mesh therewith as guided by the guide rollers 19 and 19. Thus, when the motor 14 is driven, the sprocket wheel 12 is driven to rotate to move the chain 17 which, in turn, causes the turntable 2 to rotate in the direction indicated by the arrow. In this case, it is preferable to have the driving device D and the center supporting structure 5 on a common base plate 20 because the forces applied to the respective components by the chain 17 may be cancelled out.

Figure 9B:
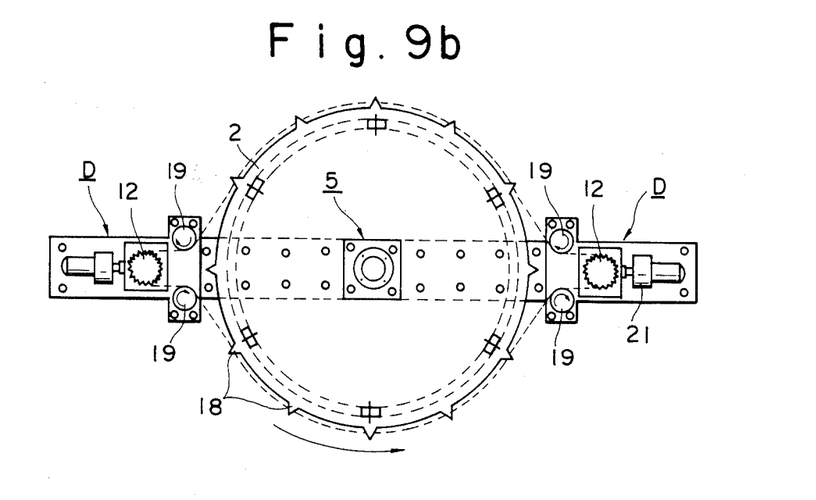

FIG. 9b shows a further alternative structure which is particularly suited for use in the case in which relatively heavy automobiles, such as buses and trucks, are to be placed on the turntable 2. In this case, a pair of driving devices D and D are disposed on both sides of the turntable 2. That is, the structure shown in FIG. 9b results by duplicating the structure shown in FIG. 9a to the left side of the turntable 2 as viewing into FIG. 9a. Also in this case, it is preferable to provide a common base plate 21 on which the pair of driving devices D and D and the center supporting structure 5 are fixedly mounted.

Referring again FIG. 4, at the side opposite to the side where the slope member 1b is disposed, there are disposed a plurality of tanks T for storing therein various oils necessary for servicing an automobile, such as gear oil, kerosene oil, oil for turbo-cars, oil for gasoline cars, oil for diesel cars and grease oil, a tank T for storing therein waste oil and an air compressor C for supplying pressurized air. For drainage of water after washing the bottom of an automobile to be serviced, it is preferable to provide an appropriate slope on the site G below the base 1 and to provide a drainageway at the lower end of such a slope.

Referring again to FIGS. 1 and 2, on the turntable 2 is provided a gate-shaped, double column type lift 22 for lifting the automobile M to be serviced in the manner of straddling the grating 3. An arm 23 is provided with its one end pivotted to the center of top beam of the lift 22. A motor 24 is mounted adjacent to the pivotal point of the arm 23, and, thus, the arm 23 may be pivotted independently of the turntable 2. A hoist 25 is mounted on the arm 23 such that it moves along the arm 23 in a reciprocating manner. A pair of sub-arms 26 and 27 is provided one on each side of the arm 23, and the sub-arms 26 and 27 are also provided with one end of each of them being pivotted to the top beam of lift 22 such that the sub-arms 26 and 27 pivot together with the arm 23. The sub-arm 26 is provided with a plurality of lamps 28 for preferentially illuminating the area of interest where servicing operation takes place and the other sub-arm 27 is provided with a plurality of sprinklers 29 for washing the top portion of the automobile M. The lamps 28 and sprinklers 29 are provided to be moved up and down individually. Also provided as extendably hanging, for example, from the sub-arm 23 is a control box 30, through which the operation and position of each of hoists 25, lamps 28 and sprinklers 29 may be remote-controlled by an operator, so that almost all of the servicing operations required for any automobile may be carried out by a single personnel efficiently as well as safely. For example, even in the case where the automobile cannot be driven to run by itself because of malfunctioning or incompleteness in manufacture, it can be easily moved up to the turntable 2 by using the hoist 25.

At the four corners of the base main body 1a, there are provided poles 31 as standing upright, and a curtain rail 33, circular in shape, is held in position by four stays 32 each extending from the corresponding one of the poles 31. And, a curtain is provided as hanging down from and being slidable along the circular curtain rail 33 for preventing the washing water from being splashed around during car washing operation. In this case, if a connection member 35 is provided to connect the curtain 34 to the arm 23 as in the illustrated embodiment, the opening or closing operation of the curtain 34 may also be carried out through the control box 30.

Figure 10A:
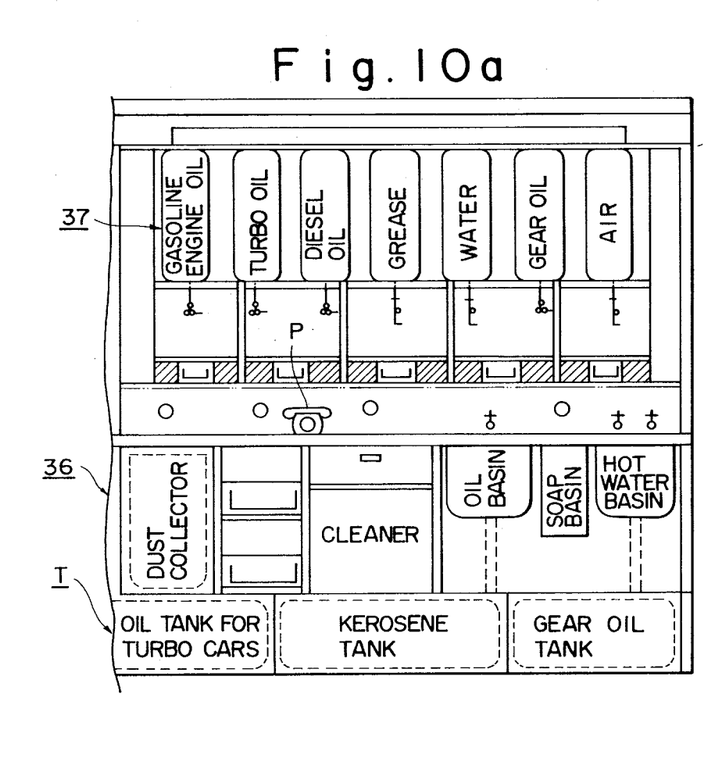
FIGS. 10a and 10b are schematic illustrations showing the arrangement of various components in a side rack provided at one side of the apparatus of FIG. 1.
Figure 10B:
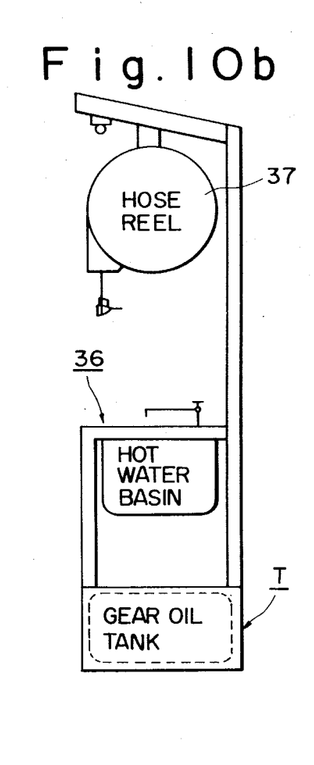

A side rack 36 is disposed above the space where various oil tanks T as described previously are provided, and the side rack 36 is provided with a parts rack, basins for various liquids, such as water, soap and oil, tool rack, dust or trash box, storing box for storing various equipment, such as cleaner and hot-water boiler utilizing wasted oil, work bench or the like. And, as shown in FIG. 2, the reels 37 having respective hoses for supplying the above-mentioned various oils, air and water as wound therearound are provided as hanging above the side rack 36. FIGS. 10a and 10b show one example of preferred arrangement of the above-mentioned reels 37 and various components of side rack 36. As shown in FIG. 10a, it is also preferable to provide a space for placing thereon a telephone P adjacent to the work bench.

In the embodiment illustrated in FIG. 1, the unit-type automobile servicing apparatus U having the above-described structure is provided in a pair with the car-bottom washer W interposed therebetween. Thus, in the illustrated embodiment, the servicing operation may be carried out individually between the two while using the washer W commonly. If desired, various other equipment, such as engine tester, may also be provided for common use. When two or more unit modules are combined as described above, it may be so structured that some of the devices and equipment necessary for the automobile servicing operation may be used commonly, which is advantageous in terms of saving of space and efficiency in use.

Figures 11A, 11B:
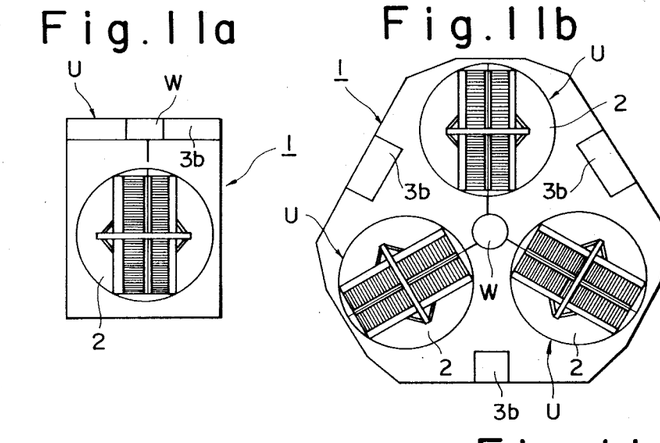
FIGS. 11a–11d are schematic illustrations showing examples of various combinations of the present automobile servicing unit structure.
Figure 11C:
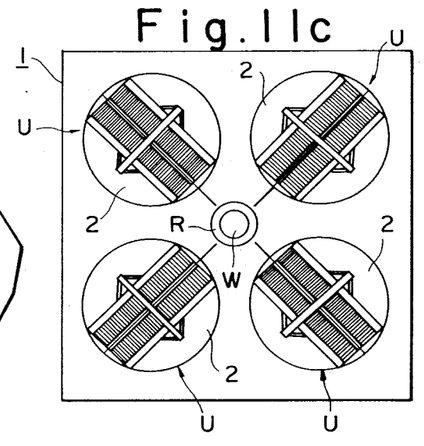
Figure 11D:
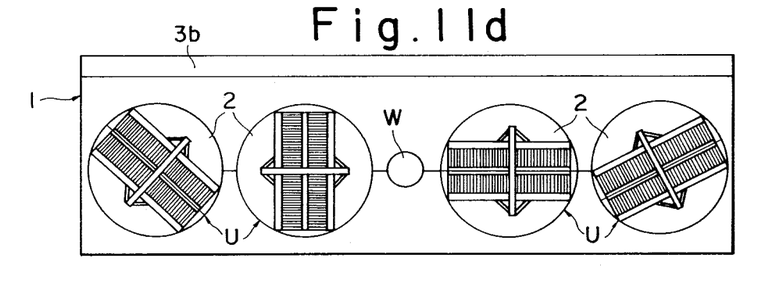

FIGS. 11a through 11d show other examples of combinations of unit modules U. FIG. 11a is the case in which the automobile servicing apparatus is comprised of a single unit module U, which is suited for an automobile servicing station having a minimum load of servicing work. FIG. 11b is the case in which the automobile servicing apparatus is defined by a combination of three unit modules U. In this case, the three unit modules U are arranged radially at equal angular intervals and the washer W is provided at the center for common use. FIG. 11c is the case in which the automobile servicing apparatus is defined by a combination of four unit modules U, which are arranged radially at equal intervals with the commonly used washer W provided at the center as riding on a center table R. On the other hand, FIG. 11d is the case in which the automobile servicing apparatus is comprised of four unit modules U arranged in a line with the washer W located at the center between the two inner unit modules U. This example is convenient for the case wherein the site is elongated in shape. It is to be noted that the present invention should not be limited only to those illustrated examples, and various combinations including 5 or more unit modules U depending not only upon the size and shape of the site but also upon the needs and capacity are also possible within the scope of the present invention.

In operation, in the first place, an automobile to be serviced is placed on the turntable 2. In this case, since the turntable 2 may be rotated in any direction to have the automobile oriented in any desired direction, the automobile may be placed onto the turntable 2 from any direction. With the automobile M placed on the turntable 2 in position, the operating conditions of lift 22, hoists 25, sprinklers 29, lamps 28 or the like may be desirably determined through the control bOx 30 so as to establish the most desirable condition to carry out the desired servicing operation. When the bottom of automobile is to be washed, the motor 14 is activated to have the turntable 2 rotated until the guide groove 4 of turntable 2 comes into alignment with the corresponding guide groove 4' provided in the base 1. Under the condition, the washer W is activated to move along the aligned guide grooves 4 and 4'. After washing the bottom of automobile in this manner, the washer W may be located in the original position on the guide groove 4' and then the turntable 2 may be rotated to have the automobile M oriented in any desired direction suitable for servicing operation. In this manner, in accordance with the present invention, nearly all of the automobile servicing operations may be carried out by a single personnel at high efficiency and safety.

Now, other embodiments of the present invention will be described with reference to FIGS. 12 and 13. It is to be noted that like numerals indicate like elements as practiced throughout the instant specification. The automobile servicing apparatus of FIG. 12 constructed as embodying the present invention is basically similar in structure to the above described embodiment excepting that the present embodiment is comprised of a single unit module and it has its section including the turntable 2 and its underlying structure located below the ground surface GL. In this embodiment, therefore, there is no need to provide the base 1.

Figure 12:
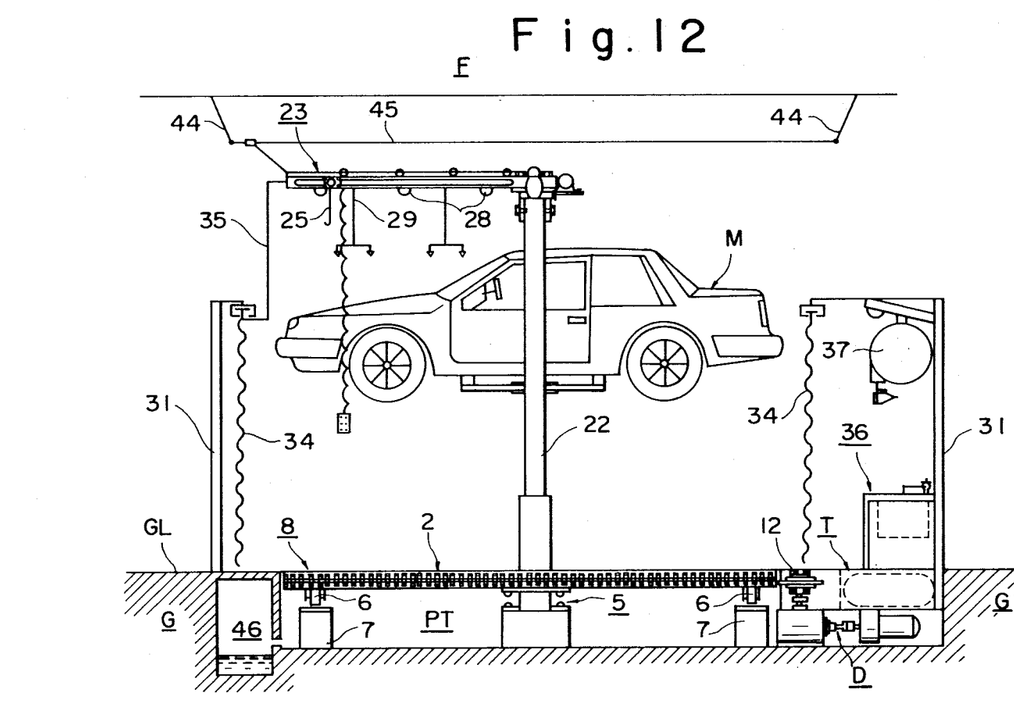
FIG. 12 is a schematic, side elevational view showing the automobile servicing apparatus constructed in accordance with another embodiment of the present invention.
Figure 13:
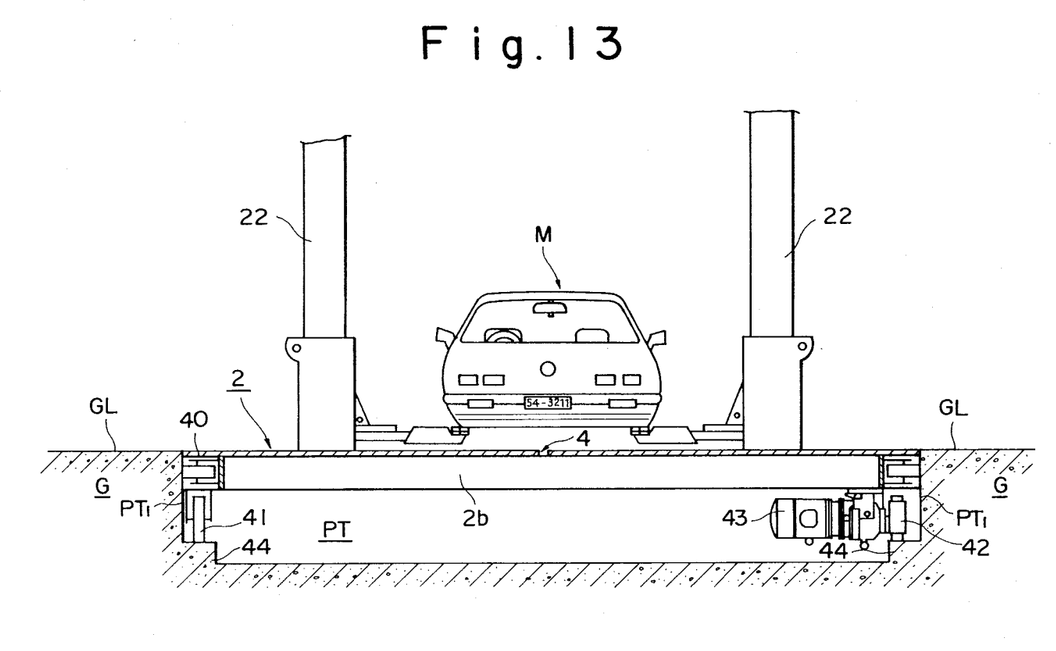
FIG. 13 is a schematic, front view showing a still another embodiment of the present invention.

The embodiment shown in FIG. 13 is similar to that shown in FIG. 12 excepting its mechanism to support and drive the turntable 2. That is, in the embodiment shown in FIG. 13, it is so structured that a plurality, e.g., six, of casters 40 are rotatably provided around the periphery of turntable 2 as spaced apart from each other at an equal interval and as being rotatable with their spin axes extending vertically and the casters 40 roll along a side wall $PT_1$ of circular pit PT, in which the turntable 2 is received with its top surface substantially flush with the ground surface GL, whereby the center of rotation of turntable 2 is determined by the rolling contact between the casters 40 and the side surface $PT_1$. On the other hand, another plurality of casters 41 are rotatably provided below and as spaced apart from each other along the peripheral portion of turntable 2. These casters 41 are provided with their spin axes extending horizontally. The turntable 2 is also provided with a driving motor 43 having a slip roller 42 as fixedly mounted on its drum 2b. The casters 41 and slip roller 42 are provided to roll along a circular guide passage 44 defined at the bottom of the pit PT and adjacent to the side wall $PT_1$. Thus, it is important that the slip roller 42 be in pressure contact with the circular guide passage 44.

As shown in FIG. 12, a circular trolley line 45 is provided as attached to a ceiling F of a building by means of stays 44. And, thus, electric power may be supplied to various parts of the apparatus through the circular trolley line 45 from above, which is advantageous because electrical lines may be prevented from getting wet by washing water as much as possible. As shown partly in FIG. 12, it is preferable to provide a drainage channel 46 at least partly around the outer periphery of the pit PT so as to guide the oil containing waste water collected in the pit PT to a oil-water separating section (not shown).

It is to be noted that in the above-described embodiments of FIGS. 12 and 13, in which the bottom section including the turntable 2 and its underlying structure is located below the ground surface, only a single unit module is provided. However, two or more unit modules may also be provided in combination, sharing some of servicing units, such as a washer, if desired, depending on the size and shape of site and the needs.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An automobile servicing apparatus comprising:
at least one turntable having a diameter suitable for placing thereon an automobile to be serviced such that all wheels of said automobile ride on said turntable;
lifting means mounted on said turntable for lifting said automobile above said turntable such that said automobile rotates on its own rotating axis, said lifting means including a pair of columns fixedly mounted on said turntable as spaced apart over a predetermined distance sufficient to locate said automobile between said pair of columns and as standing upright, a horizontal beam extending between said pair of columns at a predetermined height above said turntable to provide room for said automobile to be lifed above said turntable, and a pair of lift levers each provided to be vertically movable along the corresponding one of said pair of columns and engagable with the bottom of said automobile thereby causing said automobile to be lifted above said turntable;
supporting means for supporting said turntable to be rotatable around a predetermined spin axis whose extension defines said rotating axis; and
driving means for driving to rotate said turntable around said spin axis.

2. The apparatus of claim 1 wherein said turntable is provided with a grating at least a part thereof thereby allowing liquid to flow therethrough.

3. The apparatus of claim 2 further comprising a washing unit movable along a predetermined path for washing the bottom of said automobile, a part of said predetermined path being defined by a first guide groove provided in said turntable.

4. The apparatus of claim 3 further comprising a base having a top surface provided with at least one circular hole in which said turntable is placed such that the top surface of said base is substantially flush with the top surface of said turntable, whereby the rest of said predetermined path is defined by a second guide groove provided in the top surface of said base.

5. The apparatus of claim 4 wherein said base has two circular holes in its top surface as spaced apart from each other, each receiving therein said turntable, and said washing unit is normally placed between said two turntables on said second guide groove extending between said two turntables, whereby said washing unit may be driven into the second guide groove of selected one of said turntables by rotating said selected one until said second guide groove becomes aligned with said first guide groove.

6. The apparatus of claim 3 wherein said supporting means includes a plurality of casters rotatably mounted at the bottom of said turntable as spaced apart from each other in the circumferential direction.

7. The apparatus of claim 6 wherein said supporting means further includes a fixedly provided inner cylinder; an outer cylinder fixedly attached to the bottom center of said turntable and fitted onto said inner cylinder; and coupling means interposed between said inner and outer cylinders.

8. The apparatus of claim 7 wherein said coupling means includes at least one thrust bearing.

9. The apparatus of claim 3 wherein said lifting means further includes an arm having one end supported to said beam rotatably in the horizontal plane.

10. The apparatus of claim 9 wherein said lifting means further includes an exclusive motor mounted on said beam for rotating said arm independently of the rotation of said turntable.

11. The apparatus of claim 10 further comprising a circular curtain guide and a curtain hanging from said curtain guide, whereby the free end of said arm is connected to one end of said curtain thereby allowing said curtain to be closed or opened by the rotation of said arm.

12. The apparatus of claim 3 wherein said driving means includes a main motor; a sprocket wheel which is rotatably supported and operatively coupled to said main motor; and transmitting means for transmitting the rotation of said sprocket to said turntable.

13. The apparatus of claim 12 wherein said transmitting means includes an endless chain engaged with said sprocket.

14. The apparatus of claim 13 wherein said endless chain is fixedly attached to the outer peripheral surface of said turntable.

* * * * *